United States Patent
Nightingale

(10) Patent No.: US 6,773,251 B2
(45) Date of Patent: Aug. 10, 2004

(54) SEGMENTED WHEEL DISK FOR EXTRUSION BLOWMOLDING APPARATUS

(75) Inventor: Richard Nightingale, Woodstock, IL (US)

(73) Assignee: Pechiney Emballage Flexible Europe (FR)

(*) Notice: Subject to any disclaimer, the term of this patent is extended or adjusted under 35 U.S.C. 154(b) by 0 days.

(21) Appl. No.: 10/193,372

(22) Filed: Jul. 11, 2002

(65) Prior Publication Data
US 2004/0071813 A1 Apr. 15, 2004

(51) Int. Cl.[7] .............................................. B29C 49/36
(52) U.S. Cl. .................. 425/182; 425/192 R; 425/532; 425/540
(58) Field of Search .......................... 425/182, 192 R, 425/532, 540; 264/543; B29C 49/36

(56) References Cited

U.S. PATENT DOCUMENTS

| | | | |
|---|---|---|---|
| 2,750,624 A | * 6/1956 | Coates et al. ............... 264/543 |
| 3,941,863 A | * 3/1976 | Pollock et al. .............. 264/543 |
| 4,479,772 A | 10/1984 | Kleimenhagen ............ 425/540 |
| 4,523,904 A | 6/1985 | Martin ........................ 425/540 |
| 4,549,865 A | * 10/1985 | Myers ..................... 425/342.1 |
| 4,565,516 A | 1/1986 | Szajna et al. ............... 425/540 |
| 4,569,651 A | 2/1986 | Krall ........................... 425/532 |
| RE32,129 E | 4/1986 | Aoki ........................... 425/540 |
| 4,589,838 A | * 5/1986 | Ziegler ........................ 425/540 |
| 4,741,688 A | 5/1988 | Aoki ........................... 425/540 |
| 4,747,769 A | 5/1988 | Nakamura et al. .......... 425/540 |
| 4,801,260 A | * 1/1989 | Oles et al. ................... 425/527 |
| 4,834,642 A | 5/1989 | Voss et al. .................. 425/529 |
| 4,883,630 A | 11/1989 | Langecker ................... 264/513 |
| 4,943,228 A | 7/1990 | Reymann et al. ........... 425/540 |
| 4,943,229 A | 7/1990 | Reymann et al. ........... 425/540 |
| 5,035,600 A | 7/1991 | Voss ........................... 425/161 |
| 5,240,718 A | 8/1993 | Young et al. ................ 425/540 |
| 5,244,610 A | 9/1993 | Kitzmiller ................... 425/540 |
| 5,253,999 A | * 10/1993 | Kosuge ....................... 425/575 |
| 5,399,302 A | * 3/1995 | Noguchi et al. ............. 264/412 |
| 5,645,870 A | * 7/1997 | Larsen ........................ 425/182 |
| 5,698,241 A | 12/1997 | Kitzmiller ................... 425/540 |
| 6,113,841 A | * 9/2000 | Nielsen ....................... 264/540 |
| 6,345,973 B1 | * 2/2002 | Nielsen ....................... 425/145 |

* cited by examiner

Primary Examiner—Robert B. Davis
(74) Attorney, Agent, or Firm—McDermott Will & Emery LLP

(57) ABSTRACT

A blow molding apparatus comprising a wheel mounted rotationally on a base for rotating a plurality of molds past an extrusion die. The wheel is comprised of a hub mounted to a rotational shaft and a plurality of disk segments mounted about the hub to carry the plurality of molds. The disk segments may be individually selectively secured to the hub to facilitate simple replacement of disk segments.

23 Claims, 9 Drawing Sheets

SEGMENTED WHEEL DISK FOR EXTRUSION BLOWMOLDING APPARATUS

FIELD OF THE INVENTION

The present invention relates generally to the wheel of an extrusion blowmolding apparatus. Specifically, the present invention relates to an extrusion blow molding wheel having a disk comprising a plurality of distinct and separate segments.

BACKGROUND OF THE INVENTION

Conventional extrusion blow molding apparatuses typically comprised a wheel mounted on a rotating shaft and having a plurality of molds positioned on the wheel about the shaft for rotating the plurality of molds past an extrusion die extruding a continuous parison. Each mold typically included two mold halves each comprising a mold cavity half therein so that when the mold halves were closed the mold defined a mold cavity corresponding to the configuration of the article to be molded, such as a container. Blow molding with such an extrusion blow molding apparatus entailed rotating the wheel to move each mold, seriatim, past the extrusion die with the mold halves in an open configuration and closing the mold halves of each mold around the parison to enclose the parison within the mold defined by the mold halves. The apparatus then inserted a blowing needle into the parison within the closed mold and introduced internal pressure to the parison, forcing it to inflate and conform to the configuration of the mold cavity. The molded object was then cooled and the mold opened to release the molded object from the mold.

The wheel of prior extrusion blow molding apparatuses was comprised of a hub mounted to the rotating shaft and a wheel disk secured to the hub and extending radially therefrom. The molds and mold operating mechanisms were secured to the wheel disk in a position to facilitate delivery of the molds to the extrusion die situated adjacent to the wheel. The wheel disk of prior extrusion blow molding apparatuses comprised only a single piece. In order to accurately align the molds secured to the disk, the single-piece disk was required to be machined nearly perfectly planar. Molds located on portions of the disk that were out of planar would be out of alignment with the remaining molds and, therefore, out of alignment with the extrusion die from which the mold would receive the parison. Misalignment of the parison within the mold caused uneven material distribution and side flashing in the resulting product blown therefrom as understood by those of ordinary skill in the art. For example, it has been found that extrusions blow molding apparatuses having single-piece disks of 100 inch or greater diameter typically experienced mold misalignment of 0.2 inches of more. Larger diameter disks magnified this misalignment.

Machining a large single-piece planar disk and overcoming issues such as spring-back after releasing machining clamps made manufacture of the single-piece disk difficult and expensive. Even when a single-piece disk was machined to be planar within acceptable tolerances, the large, single-piece nature of the disk made it difficult to transport and susceptible to damage during transport or assembly of the blow molding wheel. Severe damage to a portion of the single-piece disk necessitated replacement in its entirety. Additionally, it has been found that over time, single-piece disks tended to warp out of plane due to material relaxation and other factors as is recognized by one of ordinary skill in the art.

Accordingly, there is a need for an improved disk for extrusion blow molding apparatuses.

SUMMARY OF THE INVENTION

Accordingly, it is an object of the present invention to provide a wheel type extrusion blow molding machine having a disk that is easy to machine.

It is a further object of the invention to provide a wheel type extrusion blow molding machine having a disk that will substantially limit warpage.

It is another object of the invention to provide a wheel type extrusion blow molding machine having a disk that facilitates easy replacement of a severely damaged portion thereof.

It is yet another object of the invention to provide a wheel type extrusion blow molding machine having a disk that is comprised of a plurality of discrete and separate disk segments.

It is still further an object of the invention to provide a wheel type extrusion blow molding machine having a disk that is comprised of a plurality of discrete and separate disk segments and facilitates quick replacement of multiple molds by replacing one or more disk segments.

It is still another object of the invention to provide a wheel type extrusion blow molding machine having a disk that facilitates simple conversion from a disk of all like-configured molds to a disk carrying different molds having differing cavity configurations.

It is an additional object of the invention to provide a wheel type extrusion blow molding machine facilitating simple conversion from a disk of all like-configured molds to a disk carrying multiple mold cavity configurations by replacement of one or more segments of a segmented disk.

The above objects and other objects and features of the invention will be readily appreciated by one of ordinary skill in the art from the following detailed description of the preferred embodiment for carrying out the invention when taken in connection with the appended drawings.

BRIEF DESCRIPTION OF THE DRAWINGS

FIG. 4B is a rear elevational view of the disk segment depicted in FIG. 4a.

DETAILED DESCRIPTION OF THE PREFERRED EMBODIMENTS

Figure 1A:
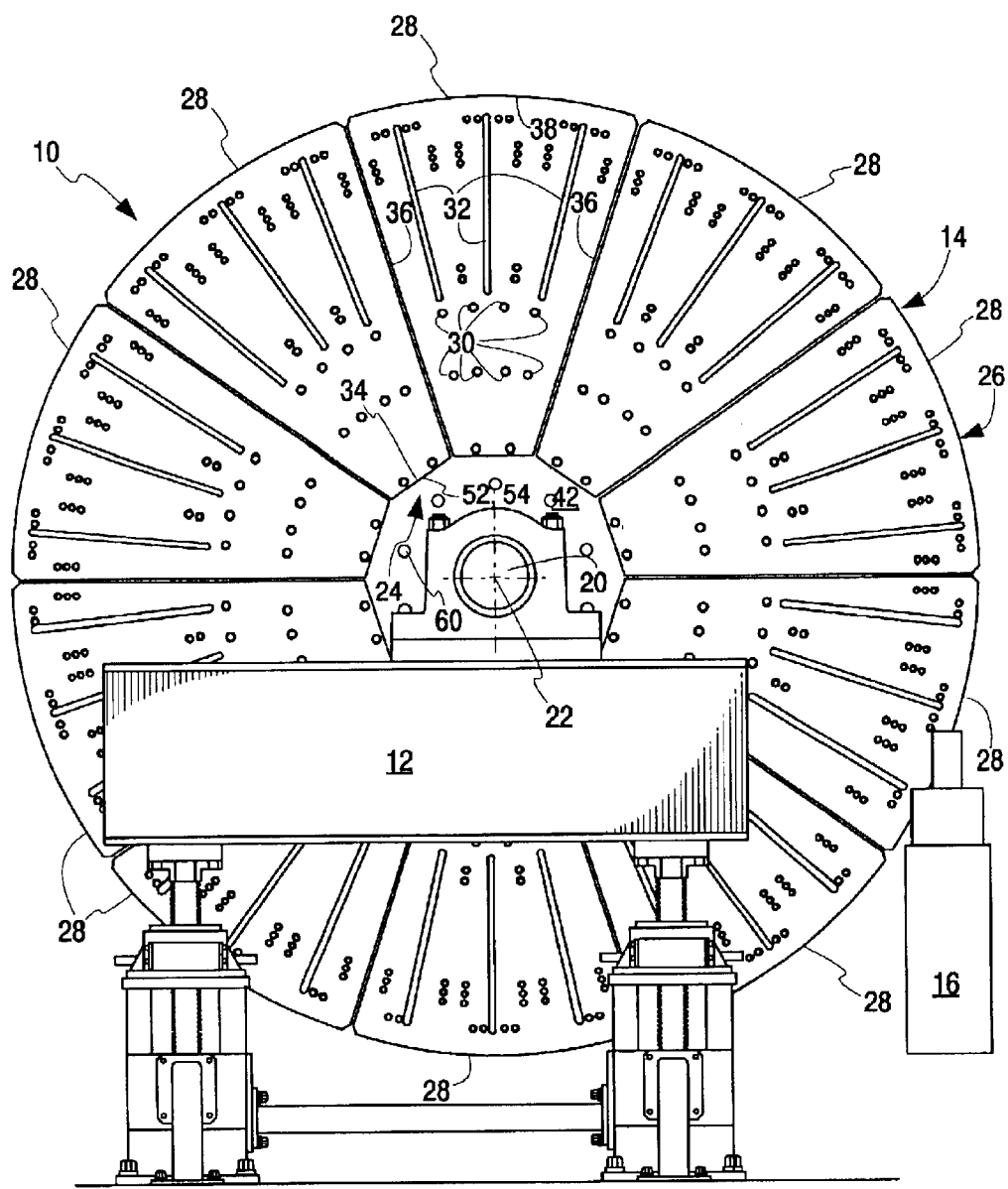
FIG. 1A is a front elevational view of the wheel of a blow molding apparatus according to the present invention shown without molds or mold clamping apparatuses.
Figure 1B:
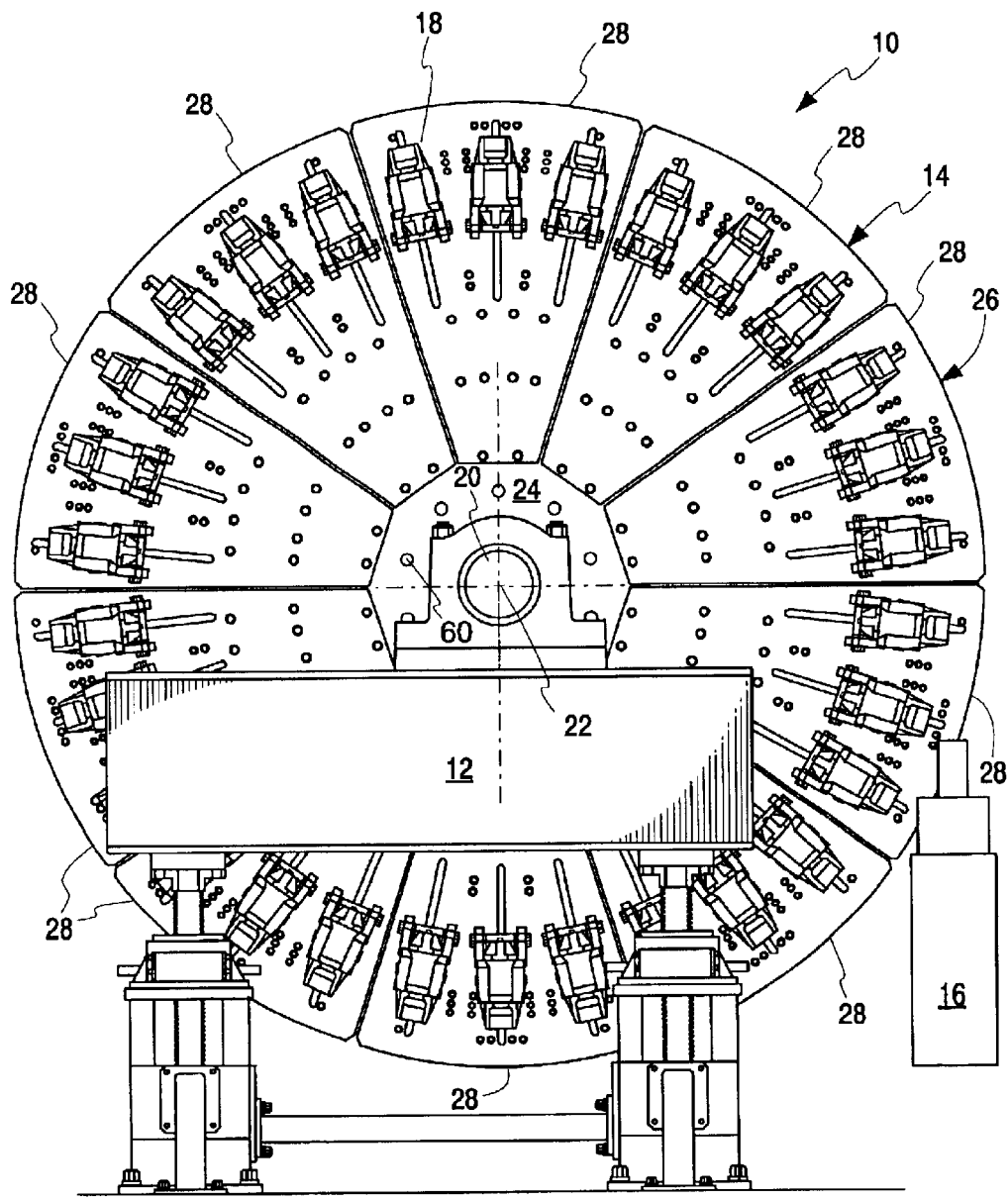
FIG. 1B is the front elevational view of FIG. 1A having molds and mold clamping apparatuses on the wheel.

The appended figures depict one embodiment of the present invention. More specifically, FIG. 1A depicts an extrusion blow molding machine 10. The blow molding machine 10 rests on a front base 12 and a rear base (not depicted) and has a rotatable wheel 14 and an extruder 16 positioned adjacent thereto. As depicted in FIG. 1B, the wheel 14 facilitates carrying a plurality of molds 18, each having an inner cavity (not depicted) to receive a parison from the extruder 16, and related clamping equipment. The wheel 14 is mounted on a shaft 20 which rotates the wheel 14 and molds 18 about a rotational axis 22 of the wheel 14 and the shaft 20 to direct each mold 18, seriatim, past the extruder 16 to receive the parison within the respective mold cavities, as is standard in the art. The molds 18 are depicted in FIG. 1B only for reference and are absent in the remaining figures for the sake of clarity.

The wheel 14 comprises a hub 24 secured to the shaft 20 and a disk 26 comprised of a plurality of separate and distinct disk segments 28, each secured to the hub 24. In the depicted embodiment, the wheel 14 comprises ten disk segments 28, each of identical construction to the others to simplify the manufacturing and assembly thereof. Any number of disk segments 28 can be employed to achieve the objectives of, and recognize the advantages of, the present invention. Indeed, even comprising the wheel 14 of only two disk segments 28 would provide a machine with some of the advantages of the present invention over a single piece disk. The disk segments 28 need not be identical to one another. Variations from one disk segment to the next is contemplated, but not depicted, as being consistent with the invention.

In the depicted embodiment, each disk segment 28 is configured to provide mounting for three distinct molds 18. The molds 18 are depicted in FIG. 1B, each having dedicated mold clamping and driving mechanisms. However, each disk segment 28 can be configured to allow any number of molds 18 to be secured thereto. In this manner, disk segments that facilitate the attachment of three molds 18, such as disk segments 28 depicted in the figures, may be replaced with disk segments (not depicted) that each facilitate the attachment of any other number of molds in order to change the number of molding stations on blow molding machine 10. The easy replaceability of the disk segments 28 thus facilitate simple and quick conversion of the depicted machine 10 from a thirty mold wheel, as shown, to a wheel comprising any number of molds 18, limited only by the size of the molds relative to the size of the wheel 14. It is also contemplated that the hub 24 could accommodate replacement of the ten depicted disk segments 28 with either a larger or smaller number of disk segments. The larger or smaller disk segments could be altered in, for example, the degrees which they extend about the axis 22. Alternatively, all or some of the disk segments 28 could be replaced with a like number of disk segments 28 of the same size and configuration, but carrying different molds in order to change some or all of the molds, as discussed above, to, for example, produce product of a different configuration.

For the sake of clarity, the figures do not depict any hydraulic or pneumatic equipment or hardware (e.g. compressor, hosing, tubing, conduits, etc.) for generating or routing power to the mold clamping equipment. It will be recognized by one or ordinary skill in the art, however, that any known hydraulic, pneumatic or other known system may be employed with the present invention to generate and route power to the mold clamping equipment and the molds as necessary for blow molding according to standard techniques.

Figure 4A:
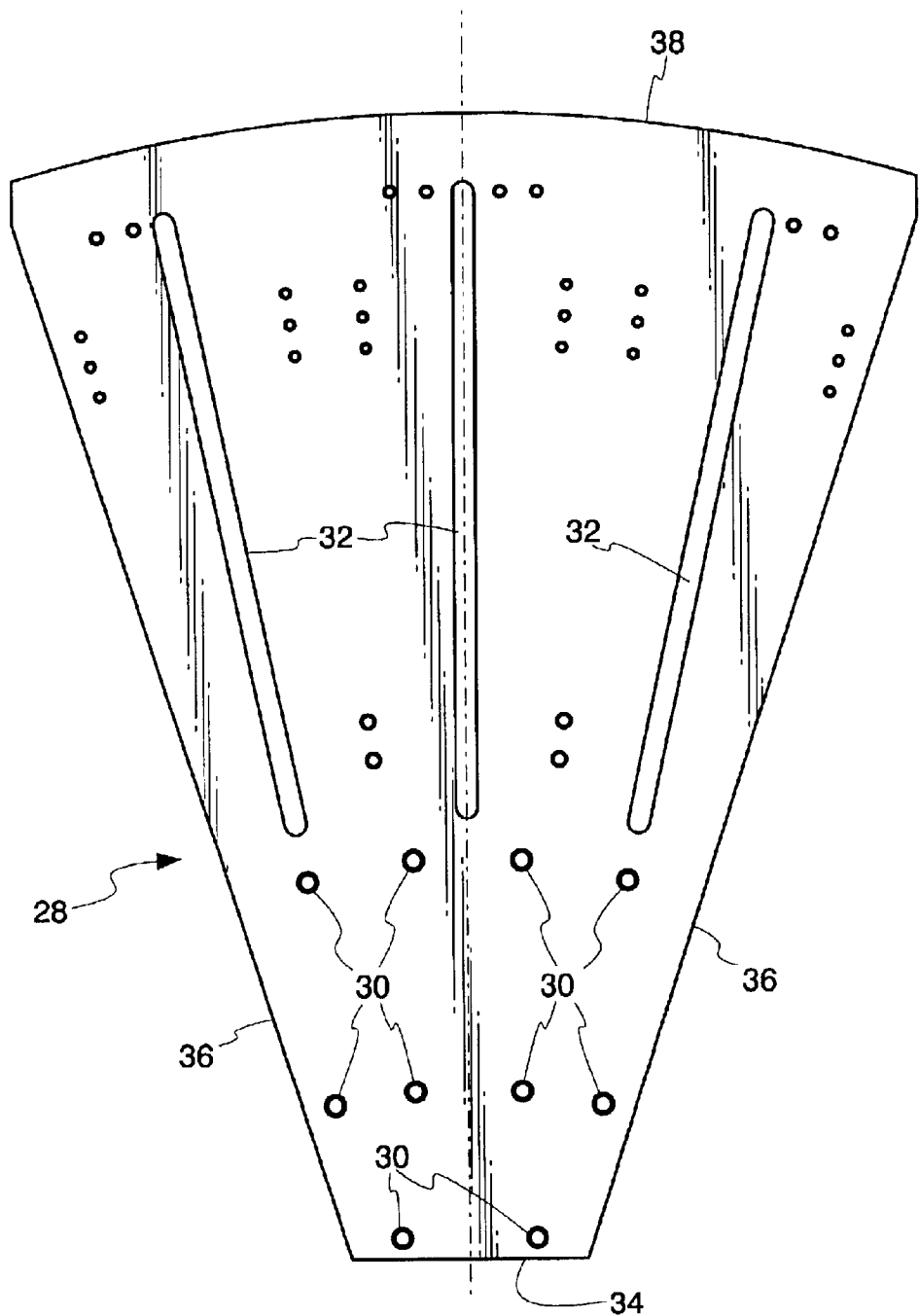
FIG. 4A is a front elevational view of one of the disk segments depicted in FIG. 1.
Figure 4B:
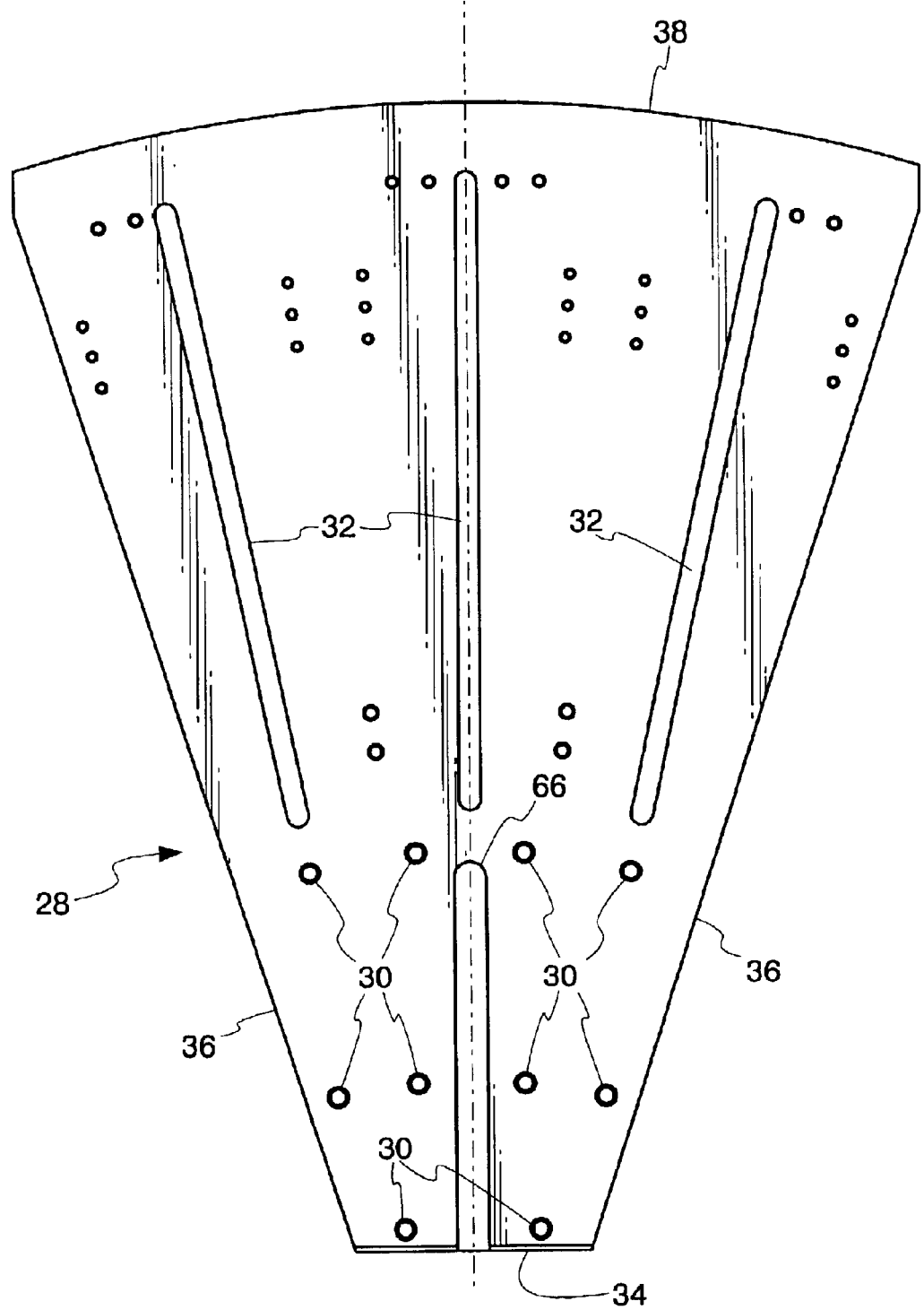

One embodiment of the disk segment 28 of the present invention is depicted in FIGS. 4A and 4B. The front of the disk segment 28, as depicted in FIG. 4A, comprises a plurality of hub mounting holes 30 to facilitate mounting the disk segment 28 to the hub 24 by bolts or other fastening devices as will be recognized by one or ordinary skill in the art. The disk segment 28 also comprises one mold mounting slot 32 for each mold 18 and clamping apparatus to be secured thereto. The elongated nature of the mold mounting slots 32 facilitate selective location of the molds 18 radially on the wheel 14 to accommodate molds of varying size. The depicted disk segment 28 comprises three mold mounting slots 32, but other numbers of mold mounting slots 32 are contemplated as required by the desired number of molds 18. Other manners of mounting the molds 18 to the disk segments 28 are contemplated and will be recognized by one of ordinary skill in the art.

Figure 2:
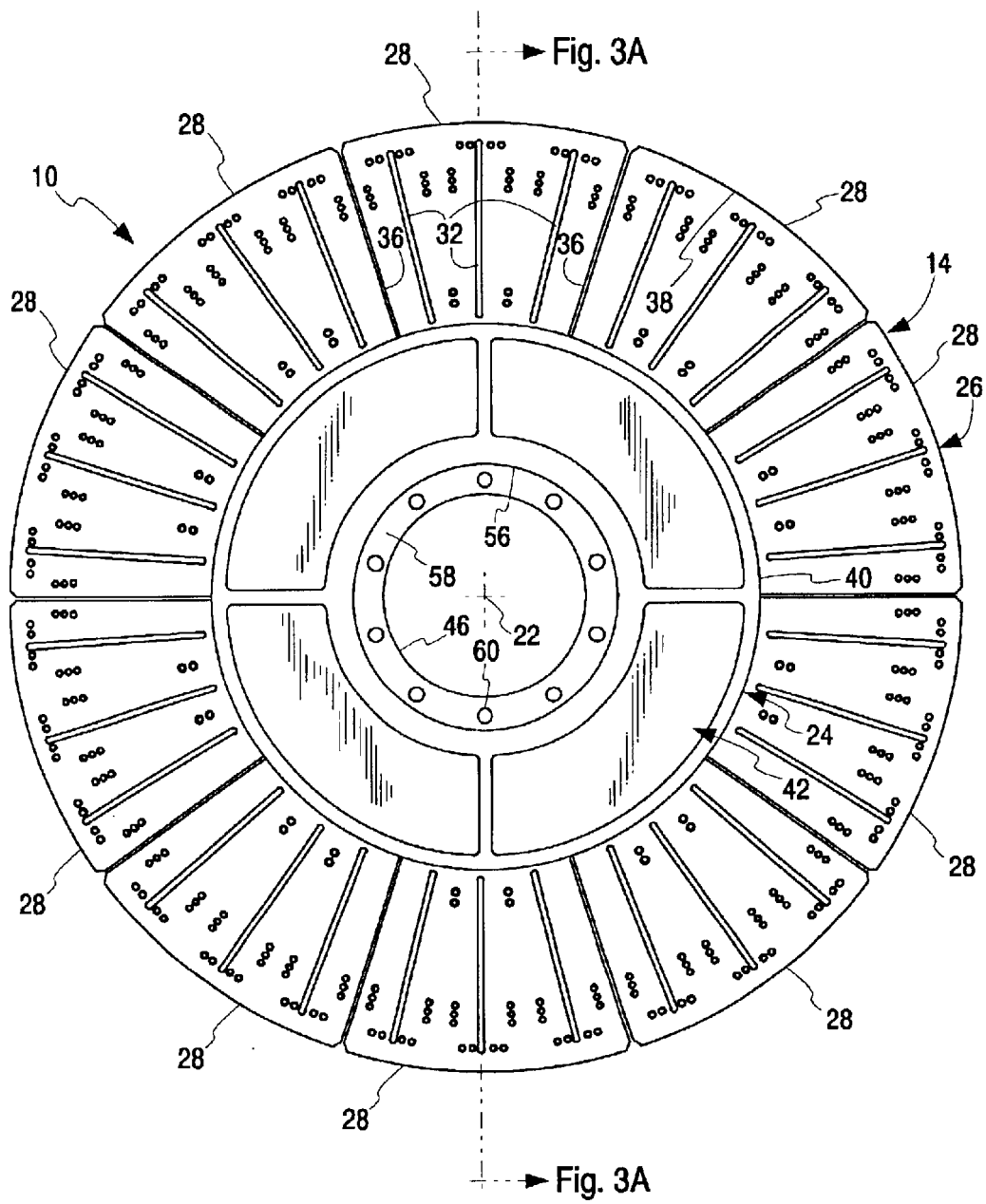
FIG. 2 is a rear elevational view of the wheel of the apparatus depicted in FIG. 1A.

The disk segment 28 further comprises a hub abutment lower end 34, a pair of opposing sides 36 and an upper end 38. The series of adjacent disk segment upper ends 38 form the outer perimeter of the wheel 14 when the disk segments 28 are all mounted as depicted in FIGS. 1A, 1B and 2. Thus configured, each of the disk segment opposing sides 36 are aligned adjacent to one of the opposing sides 36 of an adjacent disk segment 28. The hub abutment lower end 34 of each disk segment 28 is depicted as a flat for abutment with a mounting boss 50 of the hub 24. The back of the disk segment 28, as depicted in FIG. 4B, comprises the hub mounting holes 30, which extend from the front of the disk segment as through holes, and the mold mounting slots 32, which extend from the front of the disk segment 28 as through slots.

Figure 5A:
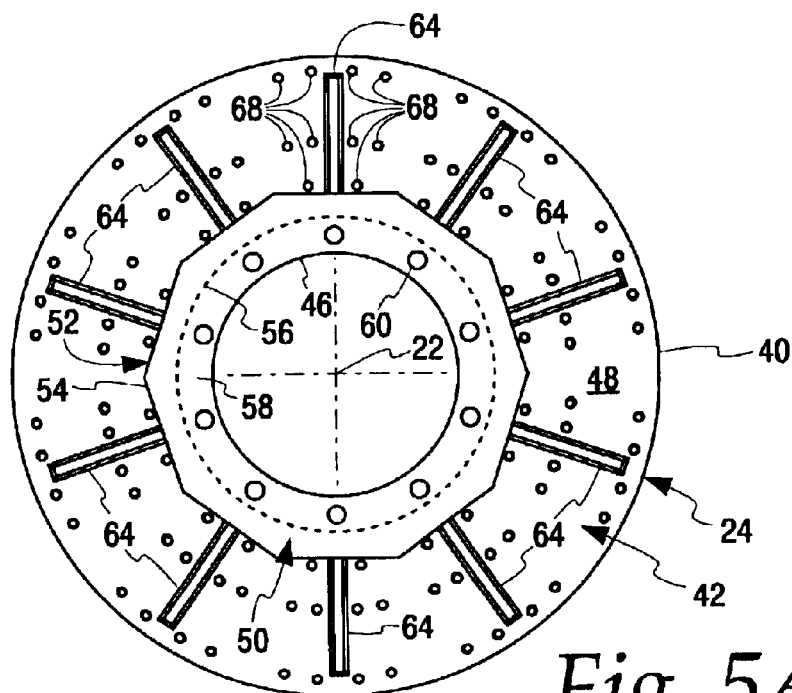
FIG. 5A is a front elevational view of the hub of FIG. 1A.
Figure 5B:
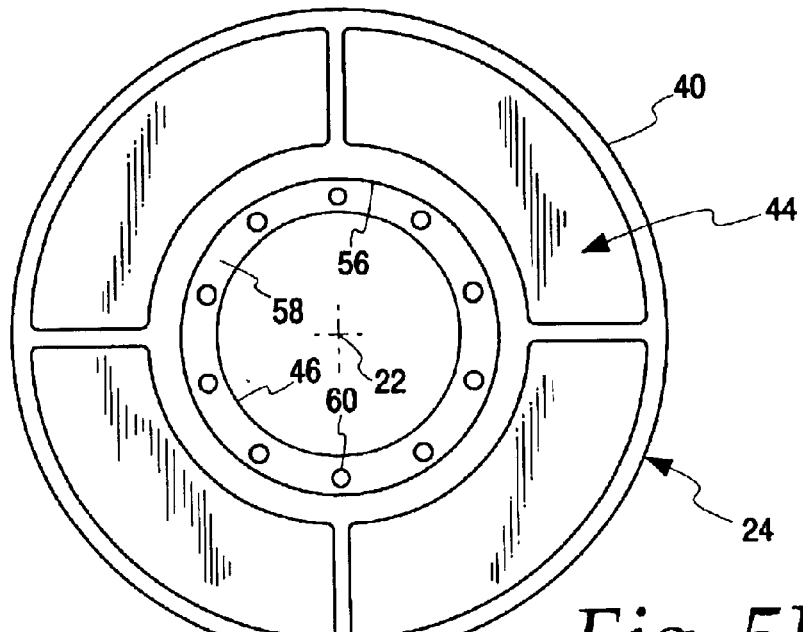
FIG. 5B is a rear elevational view of the hub of FIG. 5A.
Figure 5C:
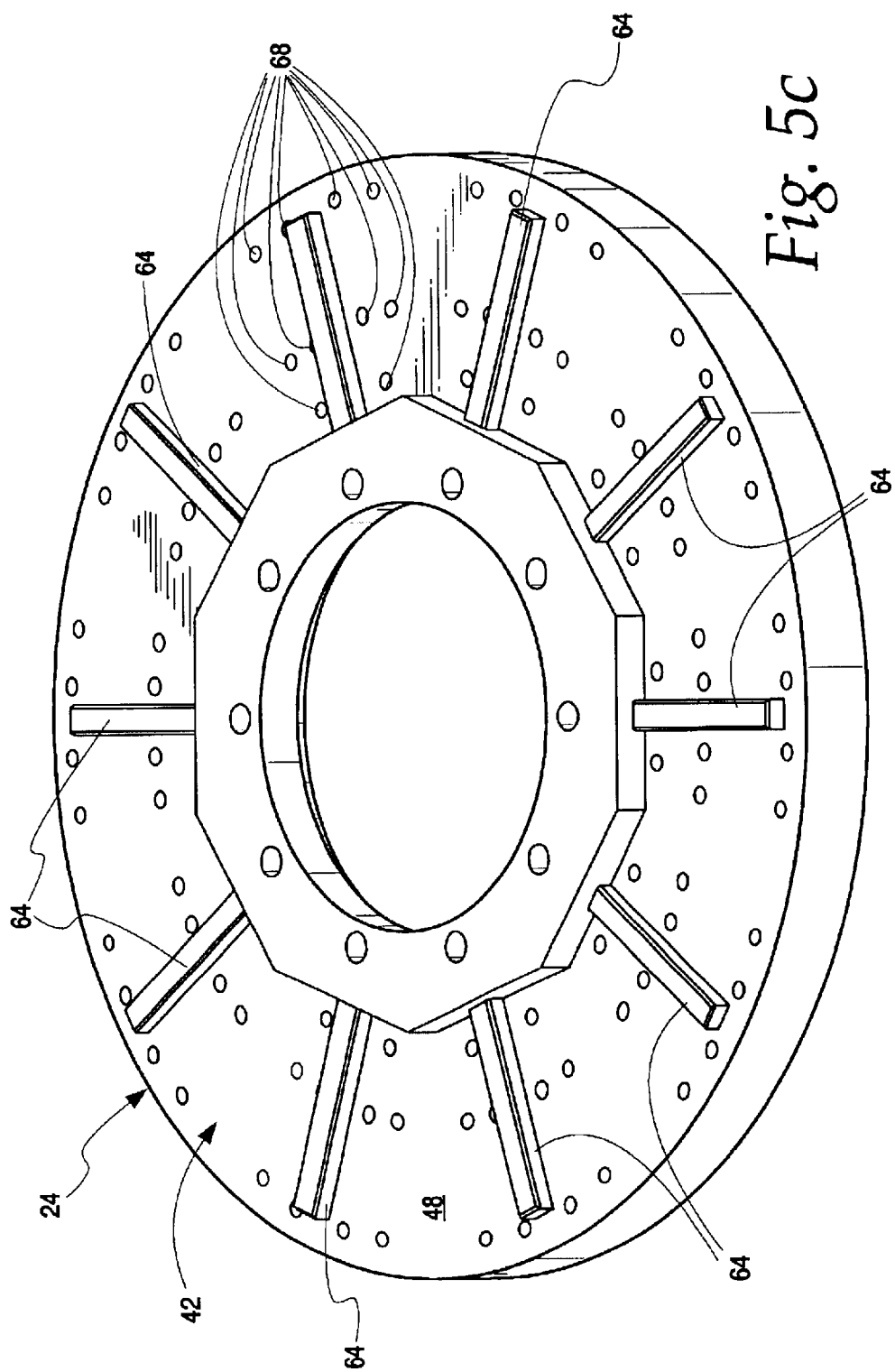
FIG. 5C is a perspective view of the front of the hub of FIG. 5A.

The hub 24, as depicted in isolation in FIGS. 5A and 5B, comprises an outer perimeter 40, a front 42 (FIG. 5A), a back 44 (FIG. 5B) and a central bore 46 to facilitate mounting of the hub 24 on the shaft 20. The hub front 42 is depicted as comprising a flat base surface 48 with the mounting boss 50 extending axially outward from the flat base surface 48 forming a decagon about its outer perimeter 52 so that the hub abutment lower end 34 of each of the ten depicted disk segments 28 will abut against one of the ten flats 54 of the outer perimeter 52. The number of flats from which the polygonal outer perimeter of the mounting boss is comprised may, of course, vary and may, though not necessarily, depend on the number of disk segments employed. While the depicted mounting boss outer perimeter 52 and the disk segment lower end 34 comprise corresponding flats for abutment, other configurations are contemplated to provide a fit therebetween that will facilitate assembly and operation within the tolerances required. For example, configurations that would assist in locating the disk segments 28 are contemplated. The hub 24 further comprises an enlarged bore 56 extending from the hub back 44 partially toward the hub front 42 leaving a flange 58 having a plurality of holes 60 therein for bolting the hub 24 to a mounting boss 62 of the shaft 20, depicted, for example, in FIGS. 3A and 3B, as residing within the hub enlarged bore 56.

Figure 3A:
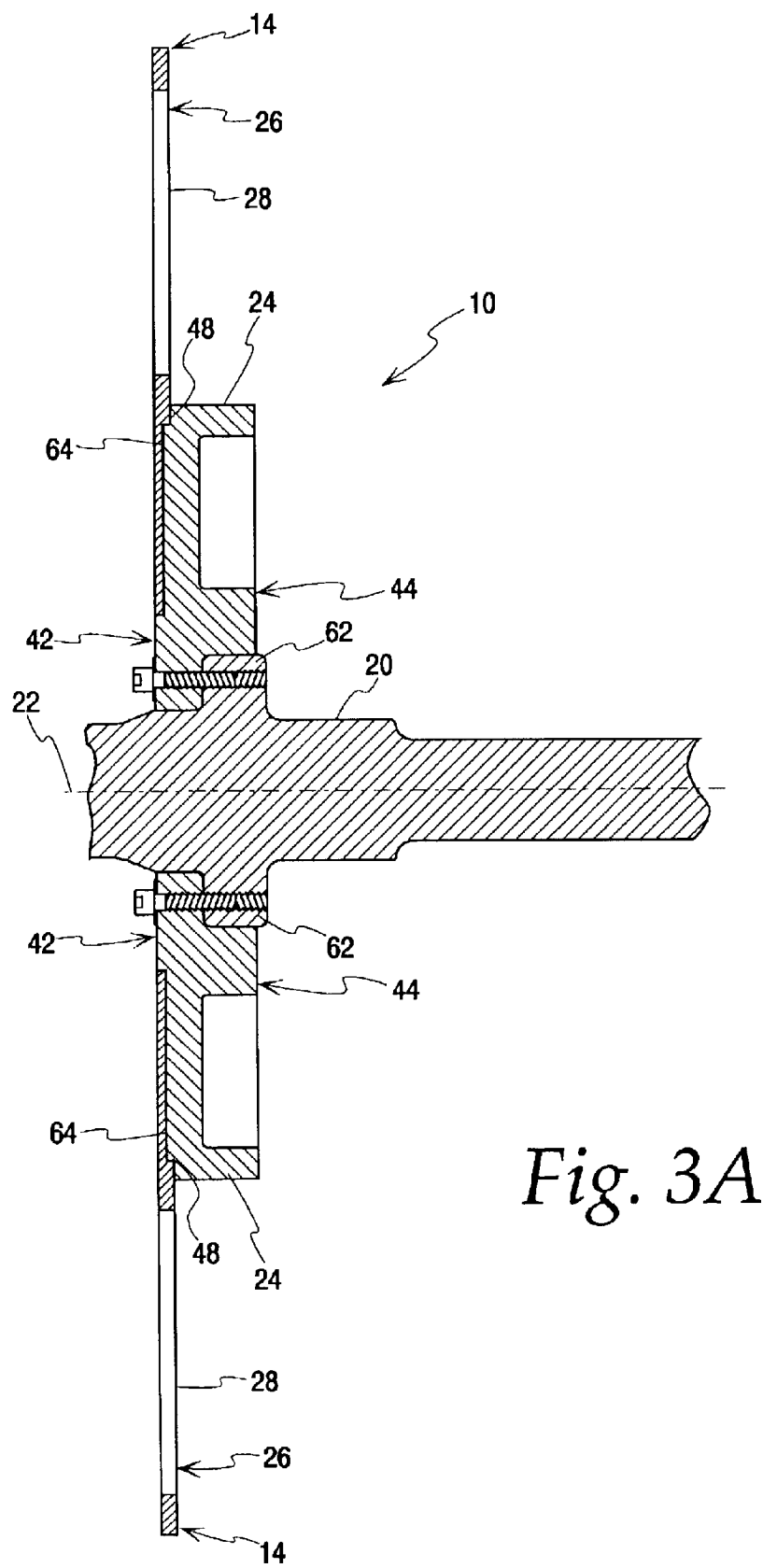
FIG. 3A is a top side cross-sectional view of the wheel and shaft of FIG. 1A.
Figure 3B:
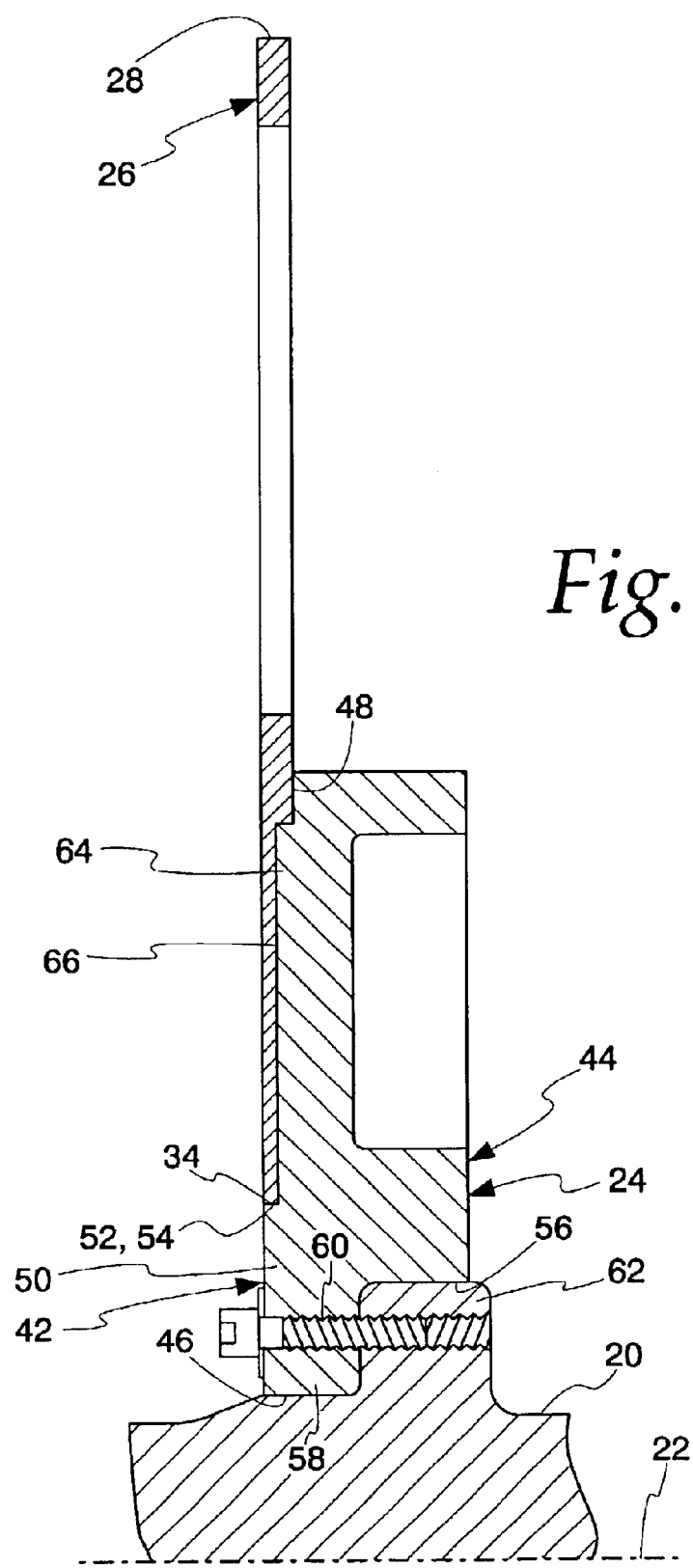
FIG. 3B is a close-up view of FIG. 3A.

A plurality of disk segment locators 64 protrude from the flat base surface 48 of the hub front 42. The disk segment locators 64 extend radially, with respect to the axis 22, from the hub mounting boss flat 54 toward, and short of, the hub outer perimeter 40 to reside in a groove 66 of a corresponding disk segment 28 as depicted in FIGS. 3A and 3B. The length, width and height of the disk segment locators 64 and corresponding grooves 66 are configured in such a manner as to provide sufficient engagement between the hub 24 and the corresponding disk segment 28 to impart the necessary rotational force to that disk segment 28 while preventing substantial shifting therebetween. The disk segment locators 64 alleviate some of the shear forces otherwise absorbed exclusively by the bolts or other securing means employed to secure the disk segment 28 to the hub 24. The location, size and shape of the disk segment locators 64 may be varied, as will be recognized by one of ordinary skill in the art, so long as they facilitate the objective of preventing substantial shifting of the disk segments 28 and reducing or eliminating shear forces on the disk segment securing means. By way of specific example, the disk segment locators 64 may be spaced from the hub mounting boss flats 54, rather than in contact therewith as depicted. The dimensions of the disk segment groove 66 are configured to correspond to those of the disk segment locator 64. Moreover, while the depicted embodiment of the present invention provides a single disk segment locator 64 for each disk segment 28, other numbers of locators 64 and grooves 66 per disk segment 28 are contemplated, for example, to accommodate disk segments extending through a greater number of radial degrees about the rotational axis 22 than the disk segments 28 depicted.

In one alternative embodiment, the disk segment locators are comprised of a key (not depicted) positioned within a groove (not depicted) in the flat base surface 48 of the hub front 42. The hub grooves may, but need not, mirror the disk segment grooves 66 in this configuration. The keys, and correspondingly the hub grooves and disk segment grooves 66 in which they reside, can vary in size, shape, length and placement as discussed above with respect to the disk segment locators 64, according to standard techniques as will be recognized by one of ordinary skill in the art.

In one embodiment, it has been found that in a disk segment 28 having a thickness of approximately 1.5 inches, a height (as measured from the hub abutment lower end of the disk segment to the upper end thereof) of approximately 54.0 inches, and a width extending through approximately 36° between opposing sides 36 of the disk segment 28, the objectives of the present invention are facilitated by a disk segment groove 66 extending approximately 17.5 inches from the hub abutment lower end of the disk segment, wherein the groove is approximately 0.77 inches deep, approximately 1.5 inches wide, and having a substantially rectangular cross-section. The corresponding disk locator 64 should be configured to protrude from the flat base surface 48 of the hub front 42 to correspond with the disk segment groove 66 configuration according to standard techniques to accomplish the objectives discussed above, as will be understood by one of ordinary skill in the art.

Other manners of preventing movement of the disk segments 28 relative to the hub 24 are contemplated. For example, the hub could be provided with a groove of similar configuration to groove 66 of the depicted embodiment, while the disk segments could be provided with a locator of corresponding configuration such as a configuration similar to that of the locator 64 of the depicted embodiment. Alternatively, the locators and grooves could be forgone in favor of heavy bolts or other attaching means that would sustain the high shear forces created by the disk segments 28 and the hub 24 and limit or prevent relative movement therebetween. Additionally, the disk segments 28 may optionally be secured to one or both adjacent disk segments 28 by one or more braces (not depicted) to increase the structural rigidity of the disk 26.

With the disk segments 28 and the hub 24 thus configured, assembly of the disk 26 onto the mounted hub 24 is accomplished by, in no particular order, simply: (a) bringing the disk segment hub abutment lower end 34 into contact with the outer perimeter 52 of the hub mounting boss 50, (b) aligning the disk segment groove 66 with the disk segment locator 64 on the hub 24, (c) bringing the back side of the disk segment 28 into contact with the flat base surface 48 of the hub front 42, (d) confirming that the disk segment 28 is properly located and seated on the hub 24, (e) removably securing the disk segment 28 to the hub 24 by bolts or other securement means through disk segment mounting holes 30 into a plurality of corresponding mounting holes 68 on the hub 24. Removal of a disk segment 28 may simply be accomplished in a reverse manner.

Exchanging disk segments 28 may be conducted to replace a damaged one or more of the disk segments 28. Alternatively, one or more of the disk segments 28 can be exchanged for a disk segment 28 of like configuration carrying molds of a different configuration than the molds that they replace. In this manner, exchanging disk segments 28 can be employed as a procedure for changing multiple molds 18 at one time (three in the case of the depicted embodiment) when, for example, a quick change of molds is desired. Indeed, the present invention readily facilitates use of the invention taught in U.S. Pat. Nos. 6,113,841 and 6,345,973, both entitled "Multiple In-Line Parison Control", the entirety of which are hereby incorporated by reference. The invention described in those patents calls for a blow molding machine having a plurality of like-configured molds about its axis to manufacture products of a first configuration, and at least one mold differing in size and/or shape from the like-configured molds to manufacture products of a second configuration differing in size and/or shape from the products of the first configuration. The present invention facilitates only briefly interrupting a run of all like-configured molds allowing the exchange one or more disk segments 28 in order to provide disk segments 28 having molds of different size and/or shape than the like-configured molds they replace and the like-configured molds with which they subsequently share the wheel.

It will be understood, of course, that the form of the invention shown and described herein is not intended to illustrate all possible forms thereof. Modifications may be made to the embodiments described herein without departing from the scope of the present invention. It will also be understood that the words used herein are words of description rather than limitation, and that various changes may be made without departing from the spirit and scope of the invention as disclosed.

I claim:

1. A blow molding apparatus comprising:
    a wheel configured to rotate about a rotational axis, the wheel comprising:
        a hub mounted on the rotational shaft; and
        a disk comprising a plurality of disk segments for carrying a plurality of molds, the disk segments being selectively removable from the hub;
        whereby the plurality of molds are disposed around the rotational axis of the wheel.

2. The blow molding apparatus of claim 1, each disk segment carrying at least one of the plurality of molds.

3. The blow molding apparatus of claim 1, the hub comprising a disk segment locator associated with each disk segment.

4. The blow molding apparatus of claim 3, each disk segment having a groove for associating with a corresponding disk segment locator on the hub.

5. The blow molding apparatus of claim 1, the plurality of molds comprising:
    a plurality of substantially identical molds, and at least one mold differing from the plurality of substantially identical molds.

6. The blow molding apparatus of claim 5, the at least one mold differing from the plurality of substantially identical molds in at least one of size and shape.

7. A wheel for a blow molding apparatus, comprising:
a hub for mounting on a rotational shaft of the apparatus, the hub defining a rotational axis of the wheel; and
a disk comprising a plurality of disk segments for locating a plurality of molds about the rotational axis, the disk segments being selectively removable from the hub.

8. The wheel of claim 7, each disk segment being for carrying at least one of the plurality of molds.

9. The wheel of claim 7, the hub comprising a disk segment locator associated with each disk segment.

10. The wheel of claim 9, each disk segment having a groove for associating with a corresponding disk segment locator on the hub.

11. The wheel of claim 7, the plurality of molds comprising:
a plurality of substantially identical molds, and
at least one mold differing from the plurality of substantially identical molds.

12. The wheel of claim 11, the at least one mold differing from the plurality of substantially identical molds in at least one of size and shape.

13. A discrete disk segment of a continuous rotary extrusion blow molding apparatus configured to associate with one or more other discrete disk segments to form a disk of the blow molding apparatus, the discrete disk segment comprising:
a hub abutment end;
an upper end configured to constitute a portion of the disk perimeter;
opposing sides configured to be disposed adjacent to opposing sides of the one or more other disk segments; and
a groove configured to locate the disk segment with respect to the one or more other disk segments.

14. The disk segment of claim 13, further being configured to carry a mold.

15. The disk segment of claim 14, further comprising a mold mounting slot configured for mounting the mold.

16. A continuous rotary extrusion blow molding apparatus comprising:
a wheel configured to rotate about a rotational axis, the wheel comprising:
a hub mounted on the rotational shaft; and
a disk mounted to the hub, the disk comprising a plurality of discrete disk segments for carrying a plurality of molds, each of the plurality of discrete disk segments comprising opposing sides with each opposing side being disposed adjacent to the opposing side of an adjacent discrete disk segment;
whereby the plurality of molds are disposed around the rotational axis of the wheel.

17. The blow molding apparatus of claim 16, the disk segments being selectively removable from the hub.

18. The blow molding apparatus of claim 16, each disk segment carrying at least one of the plurality of molds.

19. The blow molding apparatus of claim 18, the disk segments being selectively removable from the hub.

20. The blow molding apparatus of claim 16, the hub comprising a disk segment locator associated with each disk segment.

21. The blow molding apparatus of claim 20, each disk segment having a groove for associating with a corresponding disk segment locator on the hub.

22. The blow molding apparatus of claim 16, the plurality of molds comprising:
a plurality of substantially identical molds, and
at least one mold differing from the plurality of substantially identical molds.

23. The blow molding apparatus of claim 22, the at least one mold differing from the plurality of substantially identical molds in at least one of size and shape.

* * * * *